Dec. 11, 1923.                                                            1,476,969
               H. A. HOWARD
                SEWER CLEANER
              Filed Aug. 4, 1921
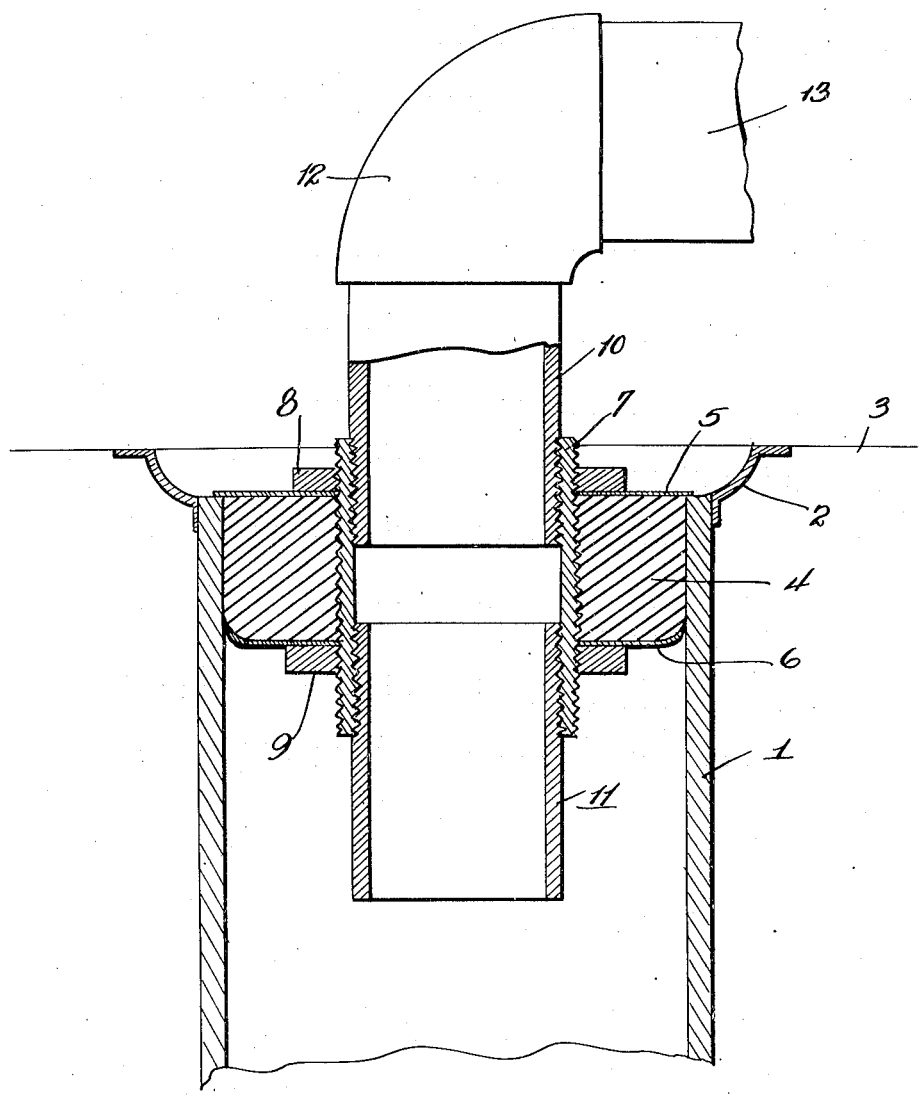
Inventor
Harry A Howard.

Patented Dec. 11, 1923.

1,476,969

UNITED STATES PATENT OFFICE.

HARRY A. HOWARD, OF SPOKANE, WASHINGTON.

SEWER CLEANER.

Application filed August 4, 1921. Serial No. 489,855.

*To all whom it may concern:*

Be it known that I, HARRY A. HOWARD, a citizen of the United States, residing at Spokane, in the county of Spokane and State of Washington, have invented certain new and useful Improvements in Sewer Cleaners, of which the following is a specification.

This invention relates to sewer cleaners and more particularly to an apparatus which may be mounted in the end of a sewer pipe whereby a tight connection will be made with a conducting pipe for permitting a pressure of steam, water or compressed air to be forced into the sewer pipe whereby the latter may be cleaned.

One of the objects of the invention is to provide an apparatus of this character which will permit an air tight connection to be made between the sewer pipe and the conducting pipe whereby a high pressure may be created within the sewer pipe to thoroughly clean the same.

Other objects of the invention will appear upon consideration of the following detail description and accompanying drawings, wherein:—

The figure illustrates a longitudinal section through the apparatus constructed in accordance with my invention.

The sewer pipe 1 is of conventional form and is connected by a flanged end or basin 2 to the floor 3. Arranged within the sewer pipe is a rubber or flexible disk 4 of a diameter sufficient to conveniently fit within the pipe as shown. The ends of the disk 4 are provided with metallic washers 5 and 6 respectively. The disk 4 and the washers 5 and 6 are mounted upon a pipe nipple 7 of metal which will not corrode and this nipple is provided with exterior and interior screw threads. Lock nuts 8 and 9 are mounted upon the opposite ends of the nipple 7 to engage the washers 5 and 6. Extension nipples 10 and 11 are threaded into opposite ends of the retaining nipple 7 on the interior thereof and the uppermost conducting nipple 10 is connected to an elbow 12 which leads from a supply pipe 13 adapted to conduct air, steam or water into the apparatus.

When the device is in use, it will be arranged in the position shown in the drawing, and the lock nut will be tightened on the exterior of the retaining nipple to cause the two brass washers 5 and 6 to press the rubber disk 4 at the ends so that the outer marginal edge of the disk will expand to tightly engage the inner surface of the sewer pipe thus making a tight connection. When this has been done, steam, water or compressed air, under a high pressure may be conducted into the sewer pipe to thoroughly clean the same.

Minor changes may be made in the details of construction without departing from the spirit of the invention or the scope of the claims hereunto appended.

What is claimed is:—

1. A device of the character described comprising in combination with a sewer pipe, a flexible disk mounted in the pipe, a retaining nipple having the disk mounted thereon, the ends of the nipple being extended and provided with exterior screw threads, lock nuts mounted on opposite ends of the nipple and adapted to engage the flexible disk whereby the disk may be spread outwardly to tightly engage the sewer pipe when one lock nut is moved toward the other, and means to conduct a pressure of air, water or steam through the said retaining nipple.

2. In combination with a sewer pipe, a flexible disk fitting therein, metallic washers provided on each end of said disk, an interior and exterior pipe nipple supporting the disk and washers, lock nuts mounted on the retaining nipple and engaging opposite ends of the disk, extension nipples threaded into opposite ends of the retaining nipple on the interior thereof, the uppermost conducting nipple being connected to an elbow and a supply pipe securely attached to the upper portion of the elbow for conducting air, steam, and water into the apparatus for cleansing the sewer pipe.

In testimony whereof I have affixed my signature in the presence of two witnesses:

HARRY A. HOWARD.

Witnesses:
LEON F. POWERS,
C. E. WIRNER.